(12) United States Patent
Yao

(10) Patent No.: US 6,836,327 B1
(45) Date of Patent: Dec. 28, 2004

(54) IN-LINE OPTICAL POLARIMETER BASED ON INTEGRATION OF FREE-SPACE OPTICAL ELEMENTS

(75) Inventor: Xiaotian Steve Yao, Diamond Bar, CA (US)

(73) Assignee: General Photonics Corporation, Chino, CA (US)

(*) Notice: Subject to any disclaimer, the term of this patent is extended or adjusted under 35 U.S.C. 154(b) by 151 days.

(21) Appl. No.: 10/101,515

(22) Filed: Mar. 18, 2002

Related U.S. Application Data

(60) Provisional application No. 60/276,801, filed on Mar. 16, 2001.

(51) Int. Cl.[7] ............................................. G01J 4/00
(52) U.S. Cl. .............................................. 356/367
(58) Field of Search .............................. 356/364–370, 356/327; 359/483, 487, 495–497, 501

(56) References Cited

U.S. PATENT DOCUMENTS

| | | | | |
|---|---|---|---|---|
| 4,158,506 A | * | 6/1979 | Collett | 356/365 |
| 5,081,348 A | * | 1/1992 | Siddiqui | 250/225 |
| 6,043,887 A | * | 3/2000 | Allard et al. | 356/364 |
| 6,177,995 B1 | * | 1/2001 | Compain et al. | 356/366 |
| 6,211,957 B1 | * | 4/2001 | Erdogan et al. | 356/364 |

OTHER PUBLICATIONS

R. Azzam, *In–line light–saving photopolarimeter and its fiber–optic analog*, 1987, Optical Society of America.

B. Scholl et al., *In–line fiber optic polarimeter with a 99 coupler*, Jun. 1995, Optical Engineering, vol. 34 No. 6.

A. Bouzid et al., *Fiber–optic four–detector polarimeter*, 1995, Optics Communications 118.

P. Westbrook et al., *In–Line Polarimeter Using Blazed Fiber Gratings*, Oct. 2000, IEEE Photonics Technology Letters, vol. 12, No. 10.

* cited by examiner

Primary Examiner—Zandra V. Smith
Assistant Examiner—Gordon J. Stock, Jr.
(74) Attorney, Agent, or Firm—Fish & Richardson P.C.

(57) ABSTRACT

In-line optical polarimeters and techniques for calibrating such polarimeters are described. In one implementation a polarimeter integrates components in free space to enhance device performance.

20 Claims, 6 Drawing Sheets

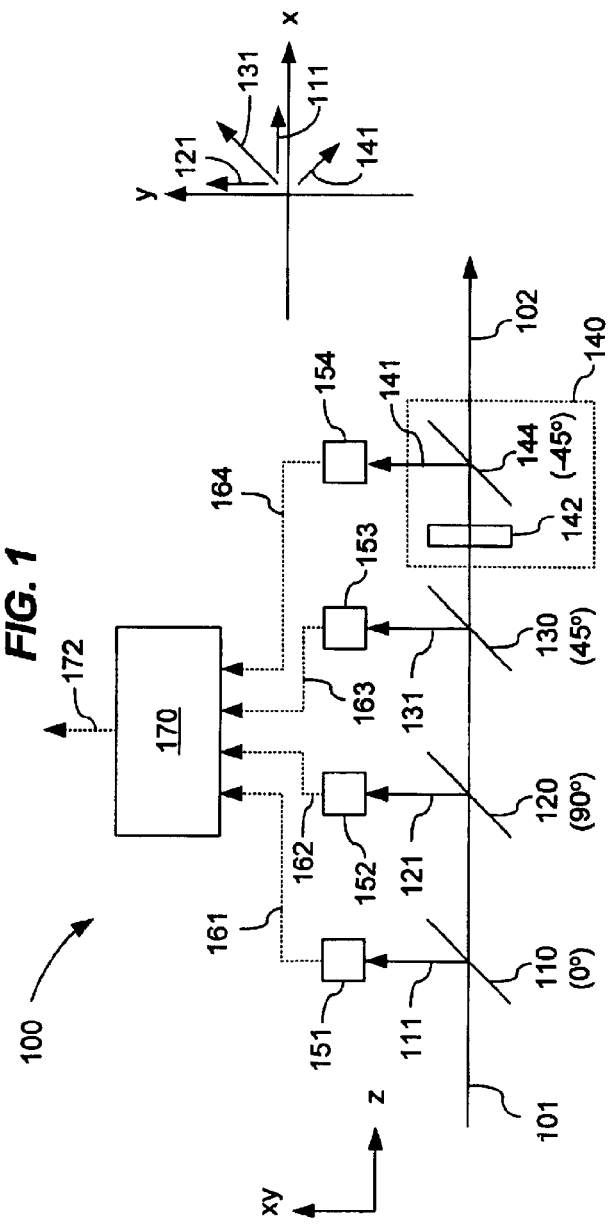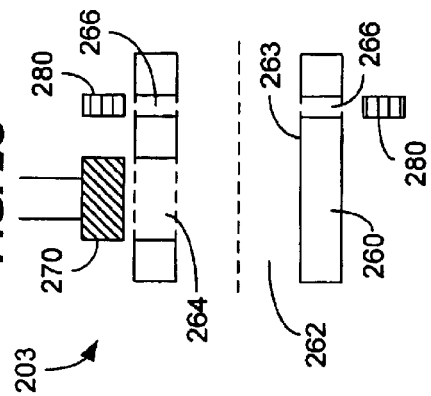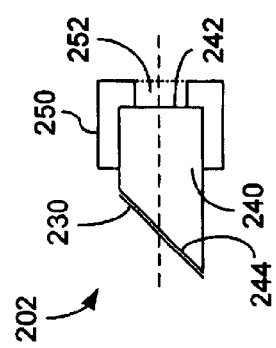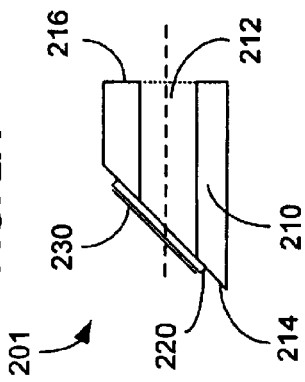

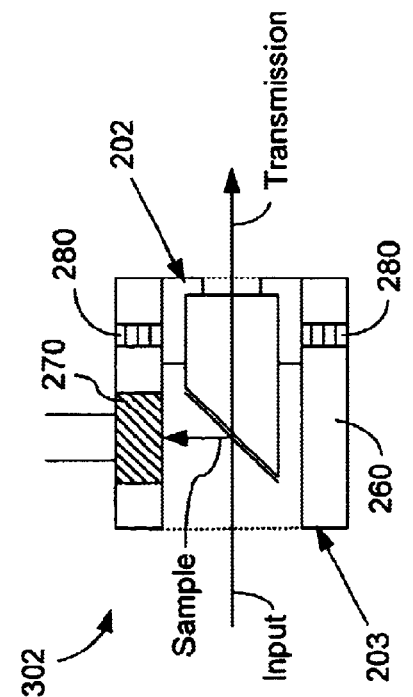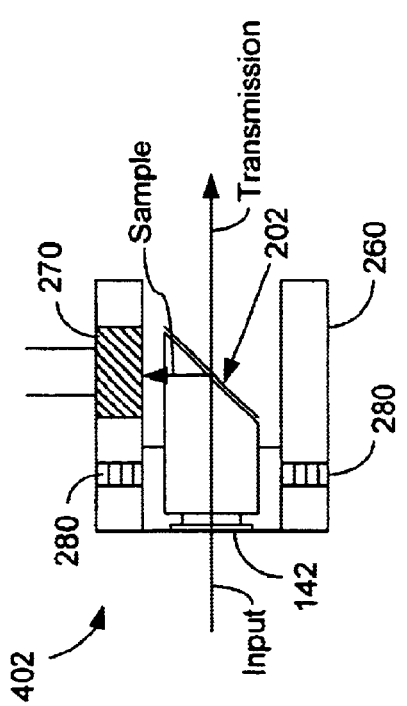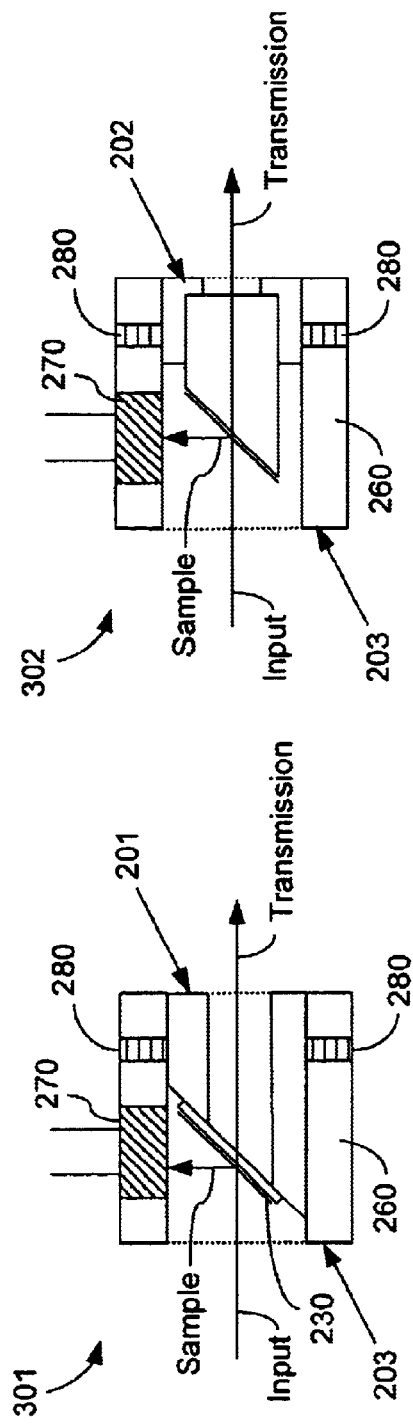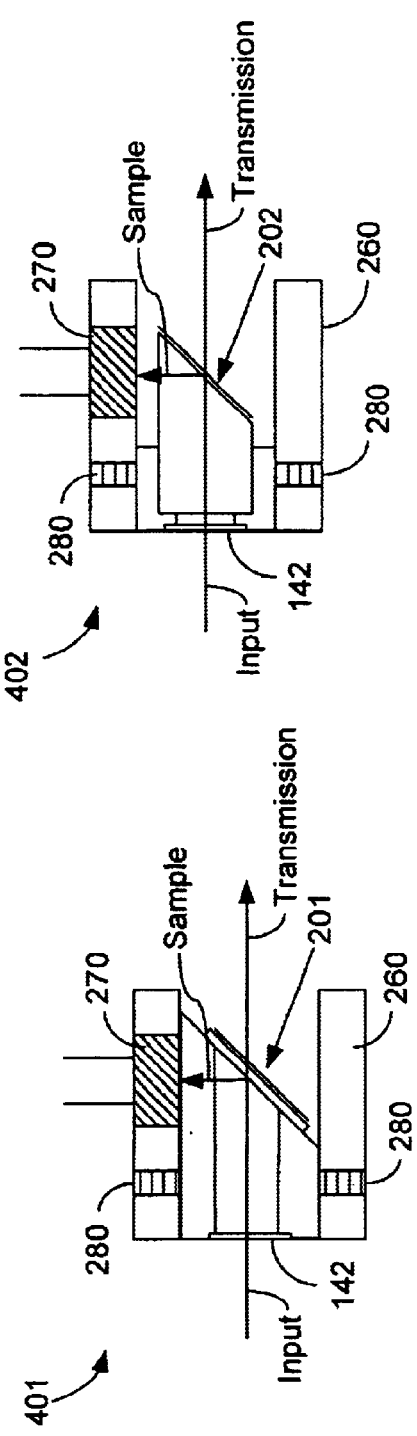

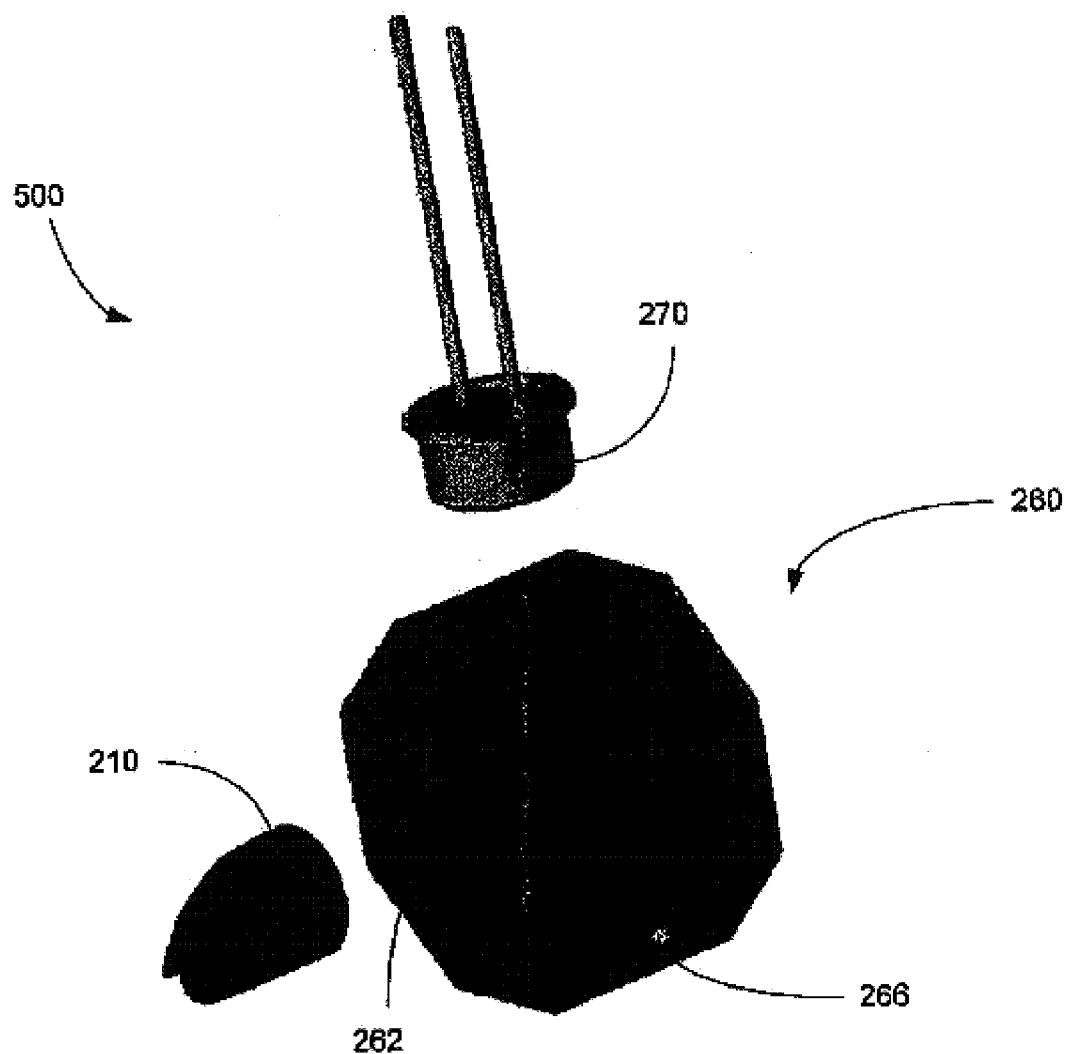

IN-LINE OPTICAL POLARIMETER BASED ON INTEGRATION OF FREE-SPACE OPTICAL ELEMENTS

This application claims the benefit of U.S. Provisional Application No. 60/276,801 filed on Mar. 16, 2001, the entire disclosure of which is incorporated herein by reference as part of this application.

BACKGROUND

This application relates to measurements of polarization of light.

The state of polarization of light is an important parameter of an optical beam in part because it affects behavior of the optical beam when interacting with an optical medium or an optical element. Various optical devices and systems can be sensitive to the state of polarization of the beam to be processed or transmitted. For example, certain coherent optical processing may require a match between the states of polarization of two separate optical beams when the two beams are superposed. For another example, a birefringent optical element may attenuate an optical signal differently when the polarization of the signal forms different angles with respect to a given principal axis of polarization of the element. An optical amplifier with a saturable gain medium may also produce a polarization-dependent gain when a polarization component with a high intensity saturates the gain medium and hence experiences an optical gain less than that of another, weaker polarization component. Furthermore, certain optical modulators may also produce different modulation depths on optical signals with different polarizations. Semiconductor electro-absorption modulators and electro-optical modulators based on birefringent crystals such as lithium niobate are examples of such modulators.

Hence, it is desirable to control the polarization of an optical signal in those and other polarization-sensitive devices and systems. To achieve such polarization control, it is essential to measure the state of polarization of the signal so that a proper polarization control can be applied in response to the measured polarization. Various polarimeters have developed to measure the state of polarization of light based on the Stokes polarization vector. Such polarimeters may be designed to split light into four different beams for measuring the Stokes vector components.

In one implementation, for example, a first beam is used to measure the total intensity of the light; second and third beams are sent through polarizers at different relative angles where the transmitted intensities are measured; and a fourth beam is sent through a phase retarder and a polarizer where the transmitted intensity is measured. The measured intensities of the four beams are then used to compute the four Stockes vector components which uniquely determine the state of polarization.

The polarization of an optical signal may not be static but dynamically vary with time in some optical systems due to fluctuations in factors such as light sources, optical components, and optical transmission media. For example, some optical fibers may be birefringent to exhibit different refractive indices for different polarizations. Typical causes for this fiber birefringence include, among others, imperfect circular cores, and unbalanced stress in a fiber along different transverse directions. Fluctuations in local a temperature and stress along a fiber line, therefore, can randomly change the axis of birefringence of the optical fiber at different locations. The polarization of light transmitting through such a fiber, therefore, may also fluctuate with time. This can also cause polarization-mode dispersion (PMD) in optical signals with two orthogonal principal polarization states.

Hence, it may also be desirable that the polarimeter operates sufficiently fast so that a polarization control mechanism can change its control in response to any variation in the input polarization of light and therefore maintain the output polarization at a desired state.

SUMMARY

In-line optical polarimeters and techniques for calibrating such polarimeters are described. In one implementation a polarimeter integrates components in free space to enhance device performance. For example, a device may include:

an optical path in free space to transmit an input optical beam;

a first polarization-selective element in said optical path having a first reflective surface at 45 degrees with respect to said optical path to reflect a fraction of said input optical beam in the S polarization to produce a first monitor beam and to transmit the remaining input optical beam along said optical path as a first transmitted beam;

a second polarization-selective element in said optical path having a reflective surface at 45 degrees with respect to said optical path and rotated from said first reflective surface around said optical path by 45 degrees to reflect a fraction of said first transmitted beam in the S polarization to produce a second monitor beam and to transmit the remaining of said first transmitted beam along said optical path as a second transmitted beam;

a third polarization-selective element in said optical path having a reflective surface at 45 degrees with respect to said optical path and rotated from said first reflective surface around said optical path by 90 degrees to reflect a fraction of said second transmitted beam in the S polarization to produce a third monitor beam and to transmit the remaining of said second transmitted beam along said optical path as a third transmitted beam;

a quarter-wave plate in said optical path to transmit said third transmitted beam as a fourth transmitted beam;

a fourth polarization-selective element in said optical path having a reflective surface at 45 degrees with respect to said optical path and rotated from said first reflective surface around said optical path by 135 degrees to reflect a fraction of said fourth transmitted beam in the S polarization to produce a fourth monitor beam and to transmit the remaining of said fourth transmitted beam along said optical path as an output transmitted beam;

four optical detectors respectively to receive said first, said second, said third, and said fourth monitor beams to produce first, second, third, and fourth detector signals, respectively; and a processing circuit coupled to receive said first, said second, said third, and said fourth detector signals to determine an input polarization state of said input optical beam.

BRIEF DESCRIPTION OF THE DRAWINGS

FIG. 1 shows one embodiment of an in-linear polarimeter.

FIGS. 2A, 2B, 2C, 3A, 3B, 4A, and 4B show exemplary implementation of the components in the device in FIG. 1.

FIG. 5A shows one embodiment of a housing for each component shown in FIGS. 2A, 2B, 2C, 3A, 3B, 4A, and 4B.

DETAILED DESCRIPTION

Figure 5B:
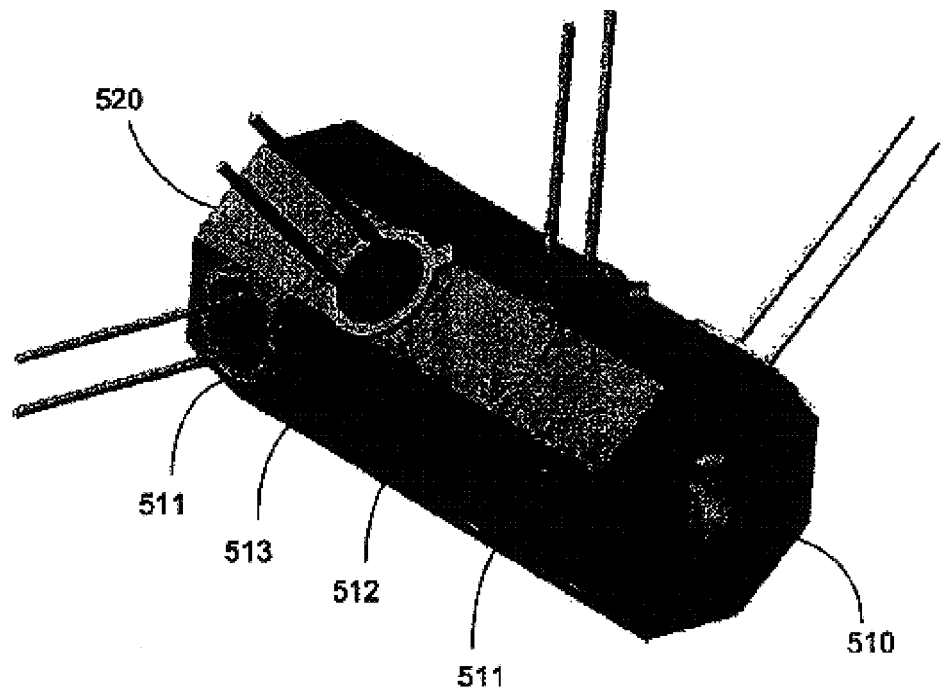
FIG. 5B shows an exemplary polarimeter formed from four components based on the housing design in FIG. 5B.

This application includes polarimeters in an "in-line" configuration where an input light, after transmitting through the polarimeters, still retains the majority of the input power and information in the input light and hence can be used for further processing or transmission. Unlike some other polarimeters where the input properties of input light, once received and measured, are essentially lost, the polarimeters described herein are essentially "transparent" to the input light by tapping a small fraction of input light form polarization measurements and allowing the majority of input light to transmit through without changing its information content.

FIG. 1 shows one embodiment of an in-line polarimeter 100 where four optical elements 110, 120, 130, and 140 are used to each tap a small fraction of an input beam 101 for polarization measurement. The optical elements 110–140 are aligned to form an optical path along which the input beam 101 is coupled into the polarimeter 100 and emerges as a transmitted output beam 102. Four optical detectors 151, 152, 153, and 154, such as photodiodes, are positioned relative to the optical elements 110–140 to receive tapped optical signals 111, 121, 131, and 141, respectively. The tapped optical signals 111–141 are converted into detector signals 161, 162, 163, and 164, respectively. A processing circuit 170 is coupled to the detectors 151–154 to process the signals 161–164 to produce an output 172 that has information on the measured state of polarization of the input beam 101.

FIG. 1 shows a xyz coordinate system to define directions of optical elements 110–140. The z direction represents the direction of the optical path defined and formed by the optical elements 110–140. The optical element 110 has an optical surface oriented at about 45 degrees with respect to the z direction to reflect a small fraction of the input light along z direction as a first tapped beam 111 to the x-direction into the first detector 151. The majority of the input beam transmits through the element 110 along the z direction. Notably, the optical surface of the element 110 is polarization sensitive and is designed to reflect a few percent, e.g., about 1%–4%, of the polarization along the x direction, i.e., the S polarization for the element 110. The remaining light, regardless of states of polarization, is transmitted through the element 110 along the z direction.

The elements 120 and 130 are similar to the element 110 and are also formed with the above polarization-sensitive surface oriented about 45 degrees with respect to the z axis. However, the element 120 has its polarization sensitive surface rotated about 90 degrees with respect to the z direction relative to the reflective surface of the element 110 so that the tapped beam 121 has a polarization along the y direction. The element 130 has its polarization sensitive surface rotated about 45 degrees with respect to the z direction relative to the reflective surface of the element 110 so that the tapped beam 131 has a polarization +45 degree with respect to x direction.

The optical element 140 includes an optical retarder 142 such as a quarter-wave plate and a polarization-sensitive surface 144. Similar to elements 110–130, the surface 144 is oriented about 45 degrees with respect to the z axis to reflect the tapped beam 141 perpendicular to the z axis into the detector 154. Unlike elements 110–130, the polarization sensitive surface 144 is rotated about 45 degrees with respect to the z direction relative to the reflective surface of the element 110 so that the tapped beam 141 has a polarization at 135 degrees (or −45 degrees) with respect to x direction. The insert in FIG. 1 illustrates the states of polarizations of the tapped beams 111, 121, 131, and 141.

Hence, the elements 110, 120, 130, and 144 may use the same design but are assembled together in the polarimeter 100 with different orientations. This design can simplify the fabrication and reduce the cost. FIGS. 2A, 2B, 2C, 3A, and 3B show examples of the design for elements 110, 120, 130, and 144.

FIG. 2A shows an optical assembly 210 as part of each optical elements 110, 120, 130, and 144. A properly-shaped holder 210 is provided to have a first end facet 214 with a 45-degree angle and a second perpendicular end surface 216. A through hole 216 is formed in the center from the facet 214 to the facet 216 to allow transmission of light. An optically transparent plate 220 is engaged to the end facet 214 and is coated with a coating structure 230 to achieve the polarization sensitive reflection. The exterior shape of the holder 210 may be cylindrical.

FIG. 2C shows a housing unit 203 for holding the assembly 201 in a proper orientation and an optical detector 270 for collecting the tapped beam from the surface 230. The housing unit 203 includes a housing 260 configured to have a through hole 262. The interior surface 263 has a shape that conforms with the exterior shape of the holder 210 of the assembly 201 so that the assembly 210 can be fit into the housing unit 203. The dimension of the hole 262 is slightly larger than that of the assembly 201 so that the assembly 201 can slide into and can be rotated within the hole 262. An aperture 264 is formed at a selected position on the housing 260 to hold the photodetector 270. Through holes 266 are also formed in the housing 260 for fixing the position of the assembly 201 by either using set screws 280 or an adhesive material.

FIG. 3A shows an optical element 301 for the elements 110, 120, 130, and 144. The assembly 201 and the housing unit 203 are assembled together. The assembly 201 is positioned to place the polarization sensitive surface 230 at the photodetector 270.

FIG. 2B further shows an optical assembly 202 alternative to the embodiment 201 in FIG. 2A. A transparent block 240 is shaped to have a 45-degree end facet 244 and a perpendicular facet 242. The polarization sensitive surface structure 230 is formed over the end facet 244. This assembly may be directly mounted to the housing unit 201 without a holder. FIG. 2B shows a holder 250 is used to hold the block 240. FIG. 39 shows that the assembly 202 and the housing unit 203 are assembled to form an optical element 302 for the elements 110, 120, 130, and 144.

The optical element 140 may be formed by adding the retarder 142 to either the device 301 shown in FIG. 3A or the device 302 shown in FIG. 3B. FIGS. 4A and 4B show two examples. Alternatively, the optical element 140 may use any of the elements 201 in FIGS. 2A and 202 in FIG. 2B by adding the retarder 142 at the output surface of the previous optical element such as 130.

FIG. 5A further shows a detailed implementation 500 of the design 301 in FIG. 3A where the exterior of the housing 260 is a hexagon.

FIG. 5B shows that 4 elements 511, 512, 513, and 514 are engaged together to form a polarimeter to receive light from the surface 510 and to output light from the surface 520. The elements 511, 512, and 513 is essentially identical in structure shown in FIG. 3A but oriented relative to one another at different angles to operate as the elements 110, 120, and 130 in FIG. 1. The spatial sequence is not critical so the element 130 may be placed at the input to receive the light 101. The element 514 may be implemented based on either the design 401 in FIG. 4A or the design 402 in FIG. 4B and is oriented to have a (−45) degree angle.

It is also contemplated that, an optional polarizer may be placed in the optical path in each of the tapped beams 111, 112, 113, and 114 to ensure that the light received by each detector is in the respective desired polarization. This option may be used when the polarization-sensitive reflective surface 230 in each of the elements 110–140 has error in its reflected polarization.

The output beam 102 is changed in two aspects compared to the input beam 101. First, the polarization of the output beam 102 is rotated by the retarder 142. Secondly, the intensity of the output beam 102 is slightly attenuated due to the optical tapping by the elements 110–140. Other than those, the beam 102 retains all other characteristics of the input beam 101, including information modulated on the beam 101. Since the amount of the rotation in the polarization by the retarder 142 is known, the output beam 102 is equivalent to the input beam 101 for all practical purposes.

It can be shown that the detector signals 161, 162, 163, and 164 are sufficient to conclusively compute the Stokes components and hence the input state of polarization of the light 101. The processing circuit 170 may be designed to carry out such computation and to generate the output 172. A microprocessor may be included in the circuit 170 to perform the computations.

Alternatively, the processing circuit 170 may be designed to store a polarization lookup table that has values of the detector signals 161–164 for all possible states of polarization of the input light. Upon receiving a set of signals from the detectors 151–154, the circuit 170 compares the received signals to the store values in the lookup table to find a match as the output 172. This lookup table may be obtained by using another polarimeter to calibrate the device 100 in FIG. 1 by measuring the polarization and detector signals 161–164 for all possible polarizations.

Figure 6:
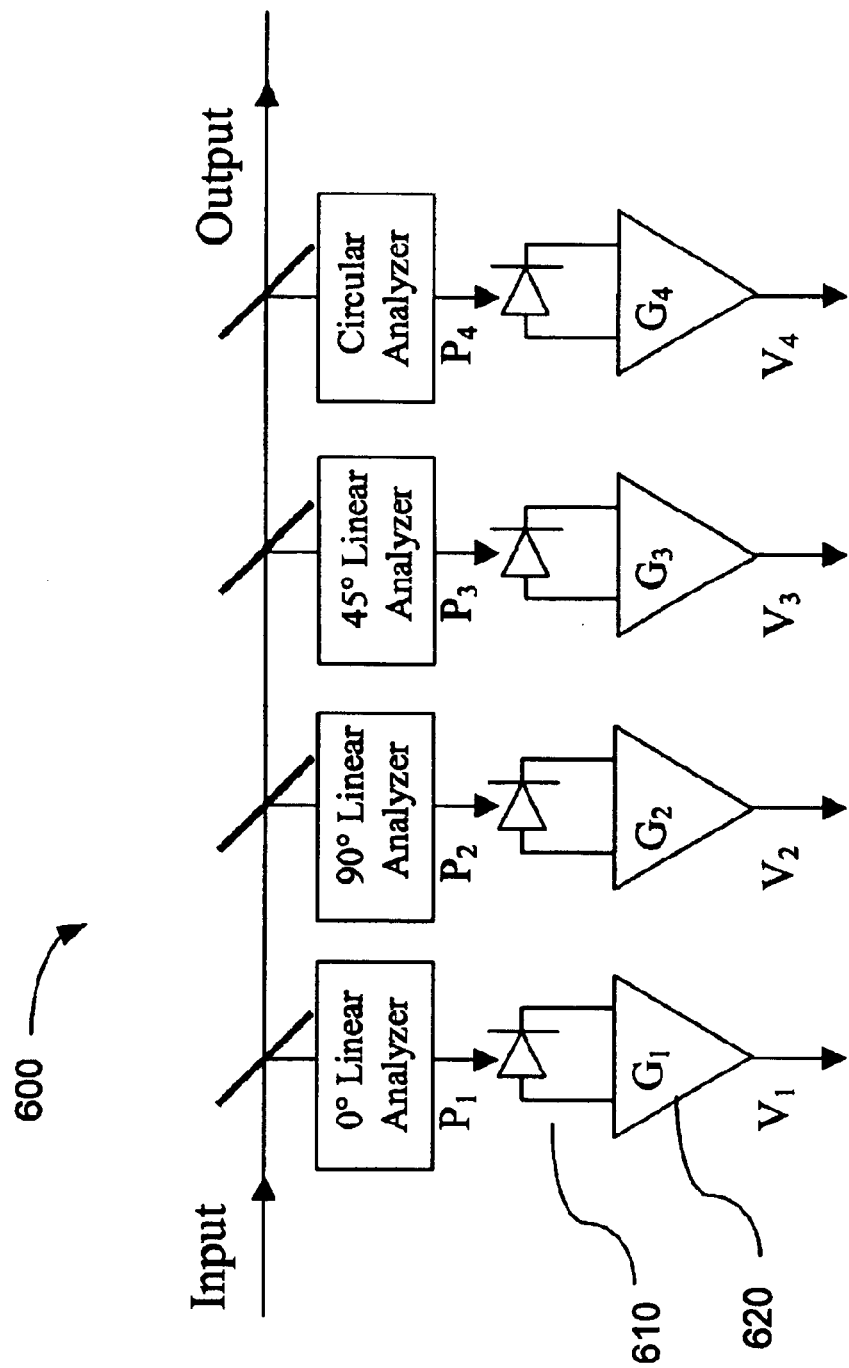
FIGS. 6 and 7 show a calibration system for the in-liner polarimeter.

FIG. 6 shows an exemplary in-linear polarimeter 600 based on the above designs, where each optical detector 610 is a photodiode and an amplifier 620 is used to amplify the detector output. As illustrated, four amplifiers 620 have gains indicated by $G_1$, $G_2$, $G_3$, and $G_4$. As described previously, four partial reflectors and four corresponding polarization analyzers are used. The first, second, and the third are linear analyzers oriented at 0°, 90°, and 45° respectively. The last one is a circular polarization analyzer. The Stokes parameters of the light passing through the device can be calculated using the four optical power values, P1, P2, P3, and P4, measured after each analyzer. Each detection channel should be properly calibrated.

Figure 7:
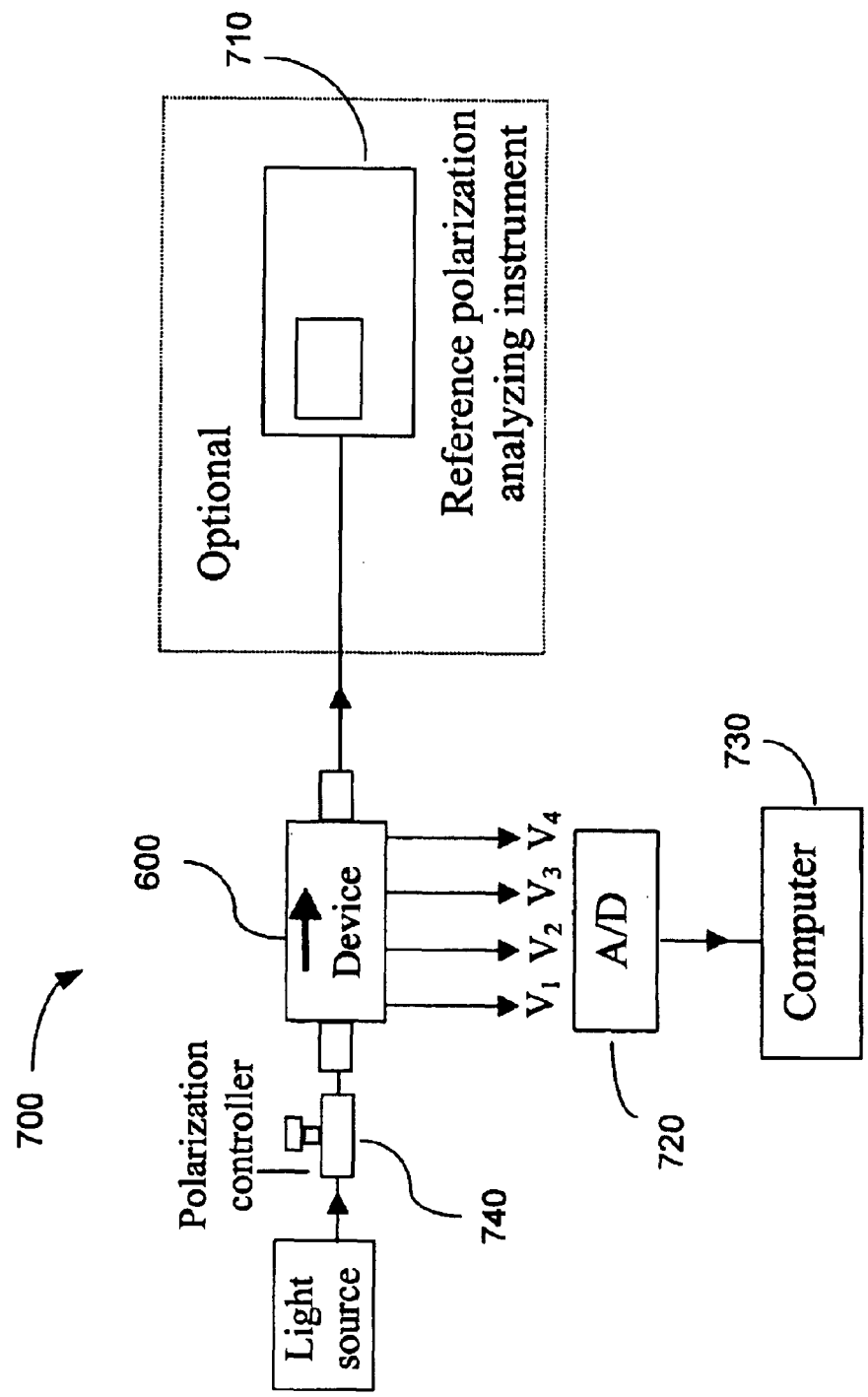

FIG. 7 illustrates a calibration system 700 that calibrates the device 600. An input polarization controller 740 is placed at the input of the device 600 to control the input polarization. An optional reference polarization analyzing instrument 710 may be used to verify the accuracy of the device 600 during the calibration. An analog-to-digital converter card (A/D card) 720 is used to convert the analog output signals from the device 600 into digital signals so that a computer or microprocessor 730 may be used to calculate SOP and DOP of the input light using the following formula:

$$\begin{bmatrix} s_1 \\ s_2 \\ s_3 \end{bmatrix} = \begin{bmatrix} (P_1 - P_2)/(P_1 + P_2) \\ [2P_3 - (P_1 + P_2)]/(P_1 + P_2) \\ [2P_4 - (P_1 + P_2)]/(P_1 + P_2) \end{bmatrix}, \quad (1)$$

$$DOP = \sqrt{s_1^2 + s_2^2 + s_3^2}, \quad (2)$$

where $P_1$, $P_2$, $P_3$, and $P_4$ are the optical powers received at the photodetectors 1, 2, 3, and 4 respectively.

The optical powers $P_1$, $P_2$, $P_3$, and $P_4$ may be calculated using the four voltages $V_1$, $V_2$, $V_3$, and $V_4$. However, calibration should be performed in order to obtain the correct optical powers at each channel for the following reasons: 1) the photodetectors 610 may have different responsivities; 2) the amplification circuits 620 may have different gains for different photodetectors 610; 3) the reflectivities of the partial reflectors and the transmission coefficients of the polarization analyzers may be different from one another; and 4) the voltages of the amplified signals may have a dependency to the wavelength due to the wavelength sensitivities of the detector, the partial reflectors, and the polarization analyzers.

In general, the relationship between the voltages and the optical powers may be expressed as:

$$V_i(\lambda) = \gamma_i(\lambda) P_i, \quad (3)$$

where $\gamma_i(\lambda)$ is the total response coefficient for channel i and i=1, 2, 3, 4.

To calibrate the device at an arbitrary wavelength γ, a polarized laser light at γ may be input to the device 600. The polarization controller 740 is adjusted so that $V_1$ reaches maximum value $V_{1max}{}^c(\lambda)$. This value is recorded. A series of maximum voltages $V_{1max}{}^c(\lambda)$ at different wavelengths may be obtained by using a tunable laser as the light source. Similarly, the polarization controller 740 may be adjusted so that $V_2$, $V_3$, and $V_4$ each reach their respective maximum values $V_{2max}{}^c(\lambda)$, $V_{2max}{}^c(\lambda)$, and $V_{4max}{}^c(\lambda)$ at different wavelengths. All these values are recorded.

Next, the total input power at the calibration wavelengths, $P_{in}{}^c(\lambda)$, to the device 600 is measured for computing the following power ratios:

$$\gamma_i(\lambda) = \frac{V_{imax}^c(\lambda)}{P_{in}^c(\lambda)} \quad (4)$$

Finally, for an arbitrary SOP and input power, the optical power received in each channel at a given wavelength may be calculated as:

$$P_i = \frac{P_{imax}^c(\lambda)}{V_{imax}^c(\lambda)} V_i \quad (5)$$

Therefore, for a given wavelength, the optical power in each channel can be calculated using the measured output voltage from the channel. When these powers are known, the SOP and DOP of the light may be conclusively computed using Eq. (1) and Eq. (2).

The reference polarization instrument 710 may now be used to verify the performance of the device 600. Such a calibration against the reference instrument should be performed before the measurement because the output fiber of the device 600 may have some residual birefringence which can cause the SOP to change. The calibration procedure described below is to align the polarization coordinate system of the device 600 with that of the reference instrument 710.

First, the polarization controller 740 is adjusted so that the SOP measured with the reference instrument 710 is linear at the 0 degree orientation and thus $$\vec{S}_a = (1,1,0,0). \quad (6)$$

Second, measured $V_1$, $V_2$, $V_3$, and $V_4$ values of the device 600 are used to compute a set of Stokes parameters using Eq. (1) to obtain $$\vec{S}_a = (a_1, a_2, a_3, a_4). \quad (7)$$

Third, the two sets of Stokes parameters are related with a 4×4 transformation matrix M:

$$\vec{S}_a = M \cdot \vec{S}_a, \quad (8)$$

where $$M = \begin{bmatrix} m11 & m12 & m13 & m14 \\ m21 & m22 & m23 & m24 \\ m31 & m32 & m33 & m34 \\ m41 & m42 & m43 & m44 \end{bmatrix}. \quad (9)$$

Four linear equations are derived from Eq. (8).

In step four, the polarization controller 740 is adjusted again such that the SOP measured with the reference instrument 710 is linear at the 90°-orientation:

$$\vec{S}_b = (1,-1,0,0) \quad (10)$$

Steps 2 to 3 are repeated here to obtain a second set of four linear equations based on Eq. (8).

In Step 5: the polarization controller 740 is adjusted such that the SOP measured with the reference instrument 710 is linear at the −45'-orientation:

$$\vec{S}_c = (1,0,-1,0) \quad (11)$$

Steps 2 to 3 are next repeated to obtain a third set of 4 linear equations.

In Step 6, the polarization controller 740 is adjusted such that the SOP measured with the reference instrument 710 is circularly polarized with a right hand rotation:

$$\vec{S}_d = (1,0,0,1) \quad (12)$$

Steps 2 to 3 are repeated to obtain a 4th set of 4 linear equations.

Finally, the above 16 linear equations are solved to obtain the all 16 matrix elements for the transformation matrix M in Eq. (9). With the transformation matrix M, the results from the polarimeter 600 may be compared with those from the reference polarization analyzing instrument 710 for any arbitrary SOP and DOP.

In the above designs, the reflector in each stage may be replaced by a reflective cube with a partial reflective 45-degree surface in the center of cube. This design may be used to reduce undesired reflections and associated interferences caused by the reflections from two surfaces of each reflector plate.

Although the present disclosure only includes a few embodiments, it is understood that various modifications and enhancements may be made without departing from the following claims.

What is claimed is:

1. A device, comprising:
   an optical path in free space to transmit an input optical beam;
   a first polarization-selective element in said optical path having a first reflective surface at 45 degrees with respect to said optical path to reflect a fraction of said input optical beam in the S polarization to produce a first monitor beam and to transmit the remaining input optical beam along said optical path as a first transmitted beam;
   a second polarization-selective element in said optical path having a reflective surface at 45 degrees with respect to said optical path and rotated from said first reflective surface around said optical path by 45 degrees to reflect a fraction of said first transmitted beam in the S polarization to produce a second monitor beam and to transmit the remaining of said first transmitted beam along said optical path as a second transmitted beam;
   a third polarization-selective element in said optical path having a reflective surface at 45 degrees with respect to said optical path and rotated from said first reflective surface around said optical path by 90 degrees to reflect a fraction of said second transmitted beam in the S polarization to produce a third monitor beam and to transmit the remaining of said second transmitted beam along said optical path as a third transmitted beam;
   a quarter-wave plate in said optical path to transmit said third transmitted beam as a fourth transmitted beam;
   a fourth polarization-selective element in said optical path having a reflective surface at 45 degrees with respect to said optical path and rotated from said first reflective surface around said optical path by 135 degrees to reflect a fraction of said fourth transmitted beam in the S polarization to produce a fourth monitor beam and to transmit the remaining of said fourth transmitted beam along said optical path as an output transmitted beam;
   four optical detectors respectively to receive said first, said second, said third, and said fourth monitor beams to produce first, second, third, and fourth detector signals, respectively; and
   a processing circuit coupled to receive said first, said second, said third, and said fourth detector signals to determine an input polarization state of said input optical beam.

2. The device as in claim 1, wherein said processing circuit includes a microprocessor.

3. The device as in claim 1, wherein each polarization-selective element includes a cube to form each reflective surface.

4. The device as in claim 1, wherein said first, said second, said third, and said fourth polarization-selective elements are identical to one another in structure and are oriented at different rotational angles with respect to said optical path.

5. The device as in claim 4, wherein each polarization-selective element includes an external housing having a central passage, and a holder unit inserted in said central passage, said holder unit having an end facet at 45 degrees with respect to said central passage to support a corresponding reflective surface that produces a corresponding monitor beam.

6. The device as in claim 5, wherein said external housing further includes an aperture in an optical path of said corresponding monitor beam, and wherein a corresponding optical detector is engaged in said aperture to receive said corresponding monitor beam.

7. The device as in claim 5, wherein said external housing further includes a through hole for fixing said holder unit within said central passage.

8. The device as in claim 4, wherein each polarization-selective element includes an external housing having a central passage, and a cube engaged to said external housing, said cube having a partial reflective surface at 45 degrees with respect to said central passage that produces a corresponding monitor beam.

9. The device as in claim 8, wherein said external housing further includes an aperture in an optical path of said corresponding monitor beam, and wherein a corresponding optical detector is engaged in said aperture to receive said corresponding monitor beam.

10. The device as in claim 1, further comprising an optical polarizer in each of said first, said second, said third, and said fourth monitor beams to selectively transmit a corresponding desired polarization to each corresponding optical detector.

11. The device as claim 1, wherein said processing includes a lookup table that stores values of said first, said second, said third, and said fourth detector signals for different input polarizations for determining said input polarization state of said input optical beam under measurement.

12. A method, comprising:
directing an input optical beam through an optical path in free space to split four monitor beams from said input optical beam for measuring an input polarization of said input optical beam and to transmit a majority of said input optical beam as an output beam;
reflecting a fraction of said input optical beam in the S polarization to produce a first monitor beam along a first direction that is perpendicular to said optical path and to transmit the remaining optical beam along said optical path;
reflecting a fraction of said input optical beam in the S polarization to produce a second monitor beam along a second direction that is rotated 90 degrees from said first direction around said optical path and to transmit the remaining optical beam along said optical path;
reflecting a fraction of said input optical beam in the S polarization to produce a third monitor beam along a third direction which is rotated around said optical path by 45 degrees from said first direction and to transmit the remaining optical beam along said optical path;
after obtaining said first, said second, and said third monitor beams, pass transmitted optical beam through a quarter-wave plate in said optical path;
reflecting a fraction of an optical beam transmitted through said quarter wave plate in the S polarization to produce a fourth monitor beam along a fourth direction which is rotated around said optical path by 135 degrees from said first direction and to transmit the remaining optical beam along said optical path as said output beam; and
converting said first, said second, said third, and said fourth monitor beams into first, second, third, and fourth detector signals, respectively; and
processing said first, said second, said third, and said fourth detector signals to determine said input polarization state of said input optical beam.

13. The method as in claim 12, wherein said processing of said first, said second, said third, and said fourth detector signals is accomplished by using a microprocessor based on the Stokes formula.

14. The method as in claim 12, wherein said processing of said first, said second, said third, and said fourth detector signals is accomplished by comparing values of said first, said second, said third, and said fourth detector signals to a lookup table that stores values of said first, said second, said third, and said fourth detector signals for different input polarizations to determine said input polarization state of said input optical beam.

15. The method as in claim 12, further comprising using a polarizer in an optical path of each of said first, said second, said third, and said fourth detector signals before reaching to a respective optical detector that converts the optical signal into a detector signal to ensure a desired polarization in light received by said respective optical detector.

16. The method as in claim 12, further comprising performing a calibration process which includes;
controlling said input polarization of said input optical beam to be at different input states of polarization;
recording values of said first, said second, said third, and said fourth detector signals for each of said different input states of polarization;
computing a corresponding input state of polarization by using said values for each of said different input states of polarization;
using a reference polarization instrument to receive said output beam and to measure an actual output polarization of said output beam for each of said different input states of polarization; and
obtaining a calibration for each computed input state of polarization based on a corresponding measured output polarization from said reference polarization instrument.

17. The method as in claim 16, further comprising performing said calibration process for light at different wavelengths.

18. The method as in claim 12, further comprising using said output beam for signal processing.

19. The method as in claim 12, further comprising using said output beam to transmit information.

20. A method, comprising:
directing an input optical beam through an optical path in free space to split four monitor beams from said input optical beam for measuring an input polarization of said input optical beam and to transmit a majority of said input optical beam as an output beam;
placing three linear polarization analyzers in said optical path with polarization directions at zero degree, 90 degrees, and 45 degrees, respectively, to obtain first, second, and third monitor beams by reflecting fractions of said input beam;
placing a circular polarization analyzer in said optical path after said three linear polarization analyzers to obtain a fourth monitor beam by reflecting a fraction of said input beam and transmitting the remaining light to produce said output beam; and
converting said first, said second, said third, and said fourth monitor beams into first, second, third, and fourth detector signals, respectively; and
processing said first, said second, said third, and said fourth detector signals to determine said input polarization state of said input optical beam.

* * * * *